United States Patent [19]

Bertola

[11] 4,299,331
[45] Nov. 10, 1981

[54] AUTOMATIC LOCKING DEVICE FOR THE LID-OPENING LEVER OF A PRESSURE-COOKER

[76] Inventor: Amalia Bertola, Via Privata Villa Ada No. 30, Omegna, Novara, Italy

[21] Appl. No.: 131,912

[22] Filed: Mar. 20, 1980

[30] Foreign Application Priority Data

Mar. 22, 1979 [IT] Italy .............................. 21160/79[U]

[51] Int. Cl.³ ............................................ B65D 85/38
[52] U.S. Cl. .................................. 220/316; 220/314; 220/318
[58] Field of Search ........................ 220/314, 316, 318

[56] References Cited

U.S. PATENT DOCUMENTS 2,917,200  12/1959  Phelan et al. ........................ 220/316
4,096,968  6/1978  Treiber et al. ....................... 220/314

Primary Examiner—George T. Hall
Attorney, Agent, or Firm—Fleit & Jacobson

[57] ABSTRACT

An automatic locking device for the lid-closing lever of a pressure-cooker.

The lever is provided with an engaging portion designed for engaging a locking pin which is operated in response to the pressure within the pressure-cooker. The pin is mounted directly on the lid and interferes with the lid-closing lever in the lowered condition of the latter, in order to prevent said lever from rotating, and therefore prevent the opening when there is some pressure in the cooker.

7 Claims, 3 Drawing Figures

AUTOMATIC LOCKING DEVICE FOR THE LID-OPENING LEVER OF A PRESSURE-COOKER

BACKGROUND OF THE INVENTION

This invention refers to an automatic locking device for pressure-cooker lids, designed to prevent the opening of the latter when there is some internal pressure.

Known pressure-cookers (for the cooking of food) are of the type comprising a cylindrical container or pot and a lid, designed to close the container from inside against a circular seat along the edge of the top opening of the aforementioned container; a lever or handle is pivoted to the lid and is provided with a cam-shaped portion which acts against a supporting crossbar, the ends of which rest on the edge of the container opening so as to clamp the peripheral edge of the lid against the circular seat of the above opening. The advantage of such kinds of pressure-cookers is that the pressure inside the cooker pushes the lid against the circular seat of the container opening during the cooking, and thus contributes to a better seal of the cooker.

Although the lids of said cookers are usually provided with suitable safety valves or devices, so as to prevent the internal pressure from exceeding certain dangerous peaks, the removal of the lid in order to open the pressure-cooker is generally hampered by the internal pressure itself, which causes the lid to adhere firmly to the aforementioned circular seat.

This feature is of great help since it makes sure that an absent-minded person cannot open the pressure-cooker accidentally by operating the closing lever, and cause damage to himself and to any person near him.

In order to open the pressure-cooker, it is therefore necessary to first let the inside steam out by opening an appropriate relief valve, or else let the pressure-cooker and its content cool so as to allow the internal pressure to drop and thus reach the atmospheric pressure level. Manufacturers usually supply detailed instructions in order to guarantee absolute safety when opening a pressure-cooker. On the other hand, when the internal pressure has dropped to minimal values (in the region of 0.1-0.2 Atm.), due to partial steam discharge or to partial content cooling, it is possible to ignore the aforementioned instructions, which prescribe that the closing lever can be operated only after the complete discharge of the steam from the relief valve, hence opening the lid before time when there still is some internal pressure residue.

At such values, in fact, the steam pressure alone is no longer capable of ensuring adequate pressure of the lid against the sealing seat; it is therefore possible to open the pressure-cooker by operating the closing lever. Under such conditions, the removal of the lid may sometimes lead to the emission of a certain quantity of high-temperature liquid and/or steam. An object of this invention, therefore, is to provide a device capable of eliminating any possibility of using the abovementioned kind of pressure-cookers in an improper way, by endowing the lid with a suitable safety device which allows operation of the lid-closing lever only when the pressure inside the same has dropped to values substantially equal to the atmospheric pressure value.

A further object of this invention is to provide a lid-locking device capable of preventing the cooker from opening accidentally while still under the action of internal pressure, which be structurally simple, strong, easy to fit onto the lid and which may, in any case, allow to act on the device itself, after having taken all necessary precautions, in the event of jamming or failure of the device in such a position as to prevent the removal of the lid.

SUMMARY OF THE INVENTION

According to this invention a locking device has been provided, which is designed to prevent the opening of a pressure-cooker in the presence of some internal pressure, the cooker being of the type comprising a cylindrical container and a lid designed to seal the container from inside, against a circular seat along the edge of the top opening of the abovementioned container, the lid being provided with a supporting crossbar the ends of which rest on the edge of the container opening, and with a lid-closing lever pivoted to the lid and capable of moving between a lifted or opening position and a lowered or closing position in which a cam-shaped portion of the lever acts against the crossbar causing the peripheral edge of the lid to press against the circular sealing seat, said lid-closing lever being provided with an engaging portion designed for engaging a locking pin, which is operated in response to the pressure in the cooker, said pressure operated pin being provided onto the lid for engaging said portion of the lever when the latter is in its lowered position.

BRIEF DESCRIPTION OF THE DRAWINGS

The foregoing as well as other features of the locking device according to this invention will be illustrated in greater detail in the description of the following embodiment, in which.

DESCRIPTION OF THE PREFERRED EMBODIMENT

Figure 1:
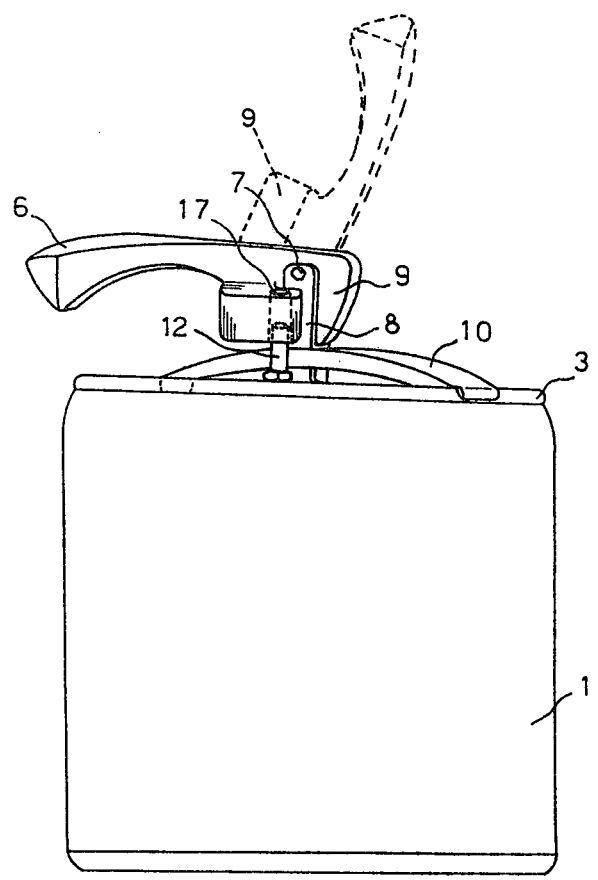
FIG. 1 is a perspective view of a pressure-cooker, the lid of which is provided with an automatic locking device.
Figure 2:
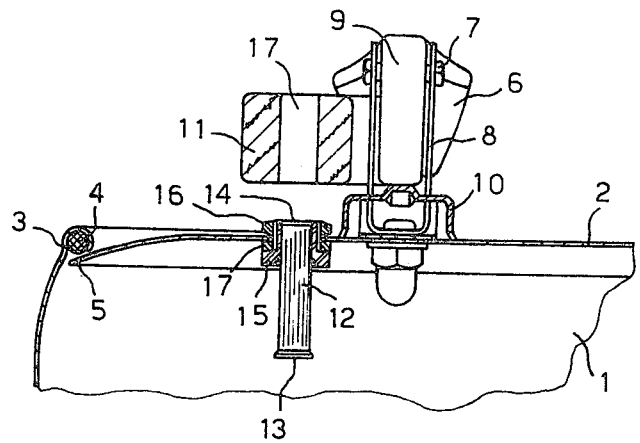
FIG. 2 is a cross-section of FIG. 1, the device being in its unlocked position.
Figure 3:
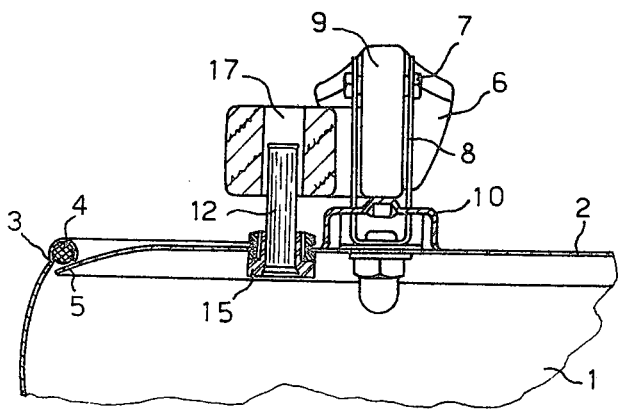
FIG. 3 is a sectional view similar to the above figure, but here the device is shown in the lid-locking position.

As appears from the figures, a pressure-cooker of the type pointed out generally comprises a cylindrical container 1, made in stainless steel, only partially visible in FIGS. 2 and 3, and a lid 2; top edge 3 of container opening is bent inwardly to define a ledge or circular seat for a sealing gasket 4 against which the circumferential edge of lid 2 is pressed until the cooker is airtight, due both to the action of a lid-closing lever, and to that of the pressure which forms in the cooker during the food-cooking process. Known and currently-employed lid-closing lever comprises a lever 6 pivoted at 7 to the end of a fork 8 which, in turn, is secured at the top and in the middle to lid 2; lid-closing lever 6 has a cam-shaped end 9 which presses against a crossbar 10, which is mobile relative to fork 8. Crossbar 10 rests with its ends on edge 3 of the opening of container 1 while a flat biasing spring (not shown) is interposed between crossbar 10 and lid 2. It is therefore obvious that by rotating lever 6 from the lifted or opening position, dashed in FIG. 1, to the lowered or closing position, indicated with the continuous lines, cam 9 of lever 6 presses against crossbar 10 thus causing edge 5 of lid 2 to adhere to gasket 4 of circular seat 3; in this way perfect seal of the pressure-cooker is ensured.

As pointed out previously, in the case of pressure-cookers of the kind shown, where the lid is closed from inside against the edge of the container opening, the pressure which builds in the pot while cooking the food, tends to lift the lid pressing it against gasket 4, thus contributing to the achievement of a better seal. It is obvious that under these conditions even if lever 6 is rotated to the opening position dashed in FIG. 1, the pressure-cooker cannot be opened because the inside pressure would, in any case, tend to keep the lid pressed against gasket 4; hence neither liquid nor steam would be released. However, if one removes the pressure-cooker from the range and therefore deprives it of the heat source, both the pressure-cooker and its content would tend to cool down, thus causing the pressure of the steam contained in the pressure-cooker itself to drop. In this way one eventually reaches a critical point where the pressure in the pot is no longer capable of pressing the lid against gasket 4 strongly enough; the consequence is that when such conditions are attained, edge 5 of the lid tends to detach from gasket 4 and the lid-closing lever 6 can be operated to open the cooker, determining the emission of hot liquid and/or steam.

In order to eliminate the possibility of opening the pressure-cooker under the foregoing conditions, provision has been made for the adoption of a pressure-sensitive device, designed to lock the closing lever, said device preventing the rotation of the lever as long as a residual steam pressure subsists in the pressure-cooker.

In the embodiment under discussion, such device entails the formation of an engaging portion or lateral protrusion 11 on closing lever 6, e.g. near its pivoting point 7; protrusion 11 may be integral to lever 6 and made of the same material as the latter, or it may be made separately of any other suitable material and then fixed to lever 6.

The abovementioned locking device comprises also a reciprocable pin 12 or piston operated by the pressure within the pot; as indicated, pin 12 is designed to move from a lowered position (FIG. 2) which it takes as a consequence of its own weight when the pressure-cooker is devoid of pressure exceeding the atmospheric one, where pin 12 is entirely within the pressure-cooker so as not to engage with protrusion 11, to a lifted position (FIG. 3) which it takes on as soon as a slight overpressure arises in the pressure-cooker; when in such position, pin 12 is entirely outside and interferes with protrusion 11 of lever 6, thus preventing the latter from rotating.

The behaviour of pin 12 may be explained, briefly, by the fact that the pressure exerted on the surface of the bottom end 13 of the pin, which is placed within the pressure-cooker, exceeds the atmospheric pressure exerted on the surface of its top end 14; hence an upward force is brought about which lifts pin 12 and keeps it lifted as long as there is a pressure in the cooker. Since the pin is relatively light, it is clear that a very small difference in pressure between ends 13 and 14 is enough to lift it.

On the other hand, in order to ensure the existence of a good safety margin and furthermore, in order to prevent the pin 12 from breaking or bending if excessive force is exerted on lever 6, it is advisable to have a pin with a not too small diameter, e.g. preferably between approximately 3 and 10 mms.

Also, in order to prevent the pin from assuming an oblique position in respect of its vertical axis, provision has been made for a guiding bush 15 fitted into a hole of lid 2 and checked, for instance, by a nut 16 which is screwed onto the threaded top end of the above bush. The portion of the bush which is placed on that side of the lid which faces the pressure-cooker interior, exhibits a circular flange, as shown in the figures, and a seal 17 is interposed between said flange and the lid.

Top end 14 of the pin 12 is slightly wider than the bush hole, so as to prevent said pin from falling into the pressure-cooker, under its own weight; similarly, also bottom end 13 has been widened slightly and thus made to adhere completely to bush 15, in order to prevent the pin from protruding entirely out and, in any case, to prevent the occurrence of steam leaks.

The lateral arrangement of protrusion 11 on lever 6 and of pin 12 of the locking device is usefully employed since it allows for the realization of such device and for the application of same in an extremely simple way; such arrangement is of advantage also in view of the fact that if the pin jams when the pressure-cooker is closed, e.g. due to the infiltration of some substance between said pin and its guiding bush, it is possible to unlock the pin pressing it down in order to open the lid: such operation can be carried out after having taken all necessary precautions, namely after having let the pressure-cooker and its content cool down completely, so that the internal pressure drops to the atmospheric pressure level.

It is however preferable that pin 12 be less easily accessible in order to make sure that the aforementioned operation cannot be executed accidentally and all-too easily, i.e. by a careless person who might try to open the cooker when still under pressure, simply pressing the pin down with his hands. In view of this problem, as shown in the sectional view of FIG. 3, when pin 12 is lifted it enters only partially into a hole 17 formed in the engaging portion 11 of the lever 6, the minor diameter of which is slightly above the maximum diameter of said pin.

It is thus possible to ensure both a better lockage of lever 6 and the fact that nobody can press the pin down with his fingers in any accidental way, since the above pin is suitably protected; on the other hand, since hole 17 is open at both ends, it is always possible to operate if some failure occurs, fitting a tool into hole 17 from above so as to press down pin 12 and unlock lever 6 in order to remove lid 2.

Pin 12 and protrusion 11, especially the portion of the latter which is designed to engage the above pin, must be placed on that side of lever 6 which is opposite to its gripping portion; it is recommended, however, that the distance between the axis of pin 12 and the vertical plane passing the axis of rotation of lever 6 be as small as possible; according to a preferred solution, the longitudinal axis of the pin lies in the aforementioned plane in order to prevent the formation of an extreme lever arm in a parallel direction to the above lever 6, which might produce a force capable of bending the pin when a force is exerted on lever 6 in the attempt to open the cooker still under pressure.

What is claimed is:

1. An automatic locking device for pressure-cooker lids designed to prevent the opening of the latter when there is internal pressure, the pressure-cooker being of the type comprising a cylindrical container having a circular sealing seat along the edge of a top opening, and a lid designed to seal the container from inside, against the circular seat, the lid being provided with a supporting crossbar the ends of which rest on the edge of the container opening, and with a lid-closing lever having a portion pivoted to the lid and capable of moving between a first, lifted or opening position and a second, lowered or closing position, said lever having a cam-shaped portion acting against the crossbar in one of the first and the second positions and being positionable so that the crossbar causes the peripheral edge of the lid to press against the circular sealing seat, a locking pin provided in said lid, and responsive to pressure in the container for movement from a lowered or disengaged position to a lifted position, said lever being provided with an engaging portion engageable by said locking pin in its lifted position, said engaging portion being provided in the form of a lateral protrusion having an opening for receiving the pin in its lifted position, the pin being separated from the lateral protrusion due to the action of its own weight when the pressure in the container is reduced.

2. A device according to claim 1, in which said pin slides in a guiding bush received in said lid.

3. A device according to claim 1, in which the diameter of said pin is between approximately 3 and 10 mms.

4. A device according to claim 1, in which said lever has a gripping portion located on one side of the portion pivoted to the lid, the engaging portion being located on the opposite side of the pivoted portion.

5. A device according to claim 1, in which the pin has a longitudinal axis that lies in a vertical plane passing through an axis of rotation of the lid-closing lever.

6. A device according to claim 1, in which the engaging portion of the lid-closing lever is provided with a pin-engaging hole extending therethrough.

7. A device according to claim 6, wherein the thickness of the engaging portion of the lever surrounding the pin-engaging hole is such that the pin in its lifted position is received in said hole with an upper end of the pin spaced from an upper surface of the engaging portion of the lever, the upper end of the pin being accessible through his hole so that the pin can be depressed into the lid.

* * * * *